United States Patent
Franken

(10) Patent No.: US 8,246,709 B2
(45) Date of Patent: Aug. 21, 2012

(54) DEVICE AND METHOD FOR CONNECTING HOUSING SECTIONS OF SOOT PARTICLE FILTERS

(75) Inventor: Bernhard Franken, Schlatt (CH)

(73) Assignee: Tehag AG, Schlatt (CH)

( * ) Notice: Subject to any disclaimer, the term of this patent is extended or adjusted under 35 U.S.C. 154(b) by 294 days.

(21) Appl. No.: 12/594,084

(22) PCT Filed: Apr. 17, 2008

(86) PCT No.: PCT/CH2008/000175
§ 371 (c)(1),
(2), (4) Date: Sep. 30, 2009

(87) PCT Pub. No.: WO2008/128370
PCT Pub. Date: Oct. 30, 2008

(65) Prior Publication Data
US 2010/0126127 A1    May 27, 2010

(30) Foreign Application Priority Data
Apr. 20, 2007   (CH) ....................................... 0668/07

(51) Int. Cl.
*B01D 46/00*    (2006.01)
*F16L 23/00*    (2006.01)
(52) U.S. Cl. ....... 55/503; 55/502; 55/DIG. 30; 285/406; 285/407
(58) Field of Classification Search ............. 55/DIG. 30, 55/502, 503; 285/406, 407, 409, 410, 411, 285/413
See application file for complete search history.

(56) References Cited

U.S. PATENT DOCUMENTS

| | | | | |
|---|---|---|---|---|
| 2,271,425 A | * | 1/1942 | Harris | 285/367 |
| 2,937,893 A | * | 5/1960 | Hill et al. | 285/328 |
| 3,144,264 A | * | 8/1964 | Lewis et al. | 285/367 |
| 3,788,677 A | * | 1/1974 | Stade et al. | 285/367 |
| 3,964,773 A | * | 6/1976 | Stade et al. | 285/367 |
| 4,579,374 A | * | 4/1986 | Bell | 285/334.4 |
| 6,632,406 B1 | * | 10/2003 | Michelin et al. | 422/178 |
| 7,047,731 B2 | * | 5/2006 | Foster et al. | 60/297 |
| 7,501,005 B2 | * | 3/2009 | Thaler | 55/523 |
| 7,517,380 B2 | * | 4/2009 | Grimm et al. | 55/523 |
| 7,779,624 B2 | * | 8/2010 | Belisle et al. | 60/299 |
| 2004/0056485 A1 | * | 3/2004 | Love et al. | 285/363 |
| 2006/0053779 A1 | | 3/2006 | Belisle et al. | |
| 2006/0067860 A1 | * | 3/2006 | Faircloth et al. | 422/171 |

FOREIGN PATENT DOCUMENTS

| | | |
|---|---|---|
| DE | 3146219 | 5/1983 |
| DE | 20012812 | 6/2002 |
| DE | 102005021646 | 11/2006 |
| EP | 0396151 | 5/1990 |
| GB | 2349189 | 10/2000 |

\* cited by examiner

Primary Examiner — Robert Clemente
(74) Attorney, Agent, or Firm — Volpe and Koenig, P.C.

(57) ABSTRACT

A device and a method for connecting housing sections (5a, 5b, 5c) of soot particle filters uses a yoke-like clamping U-bolt (17) which has, disposed along the two longitudinal sides thereof, gripper-like bulges (29), for the mutual alignment and pressing against one another of end regions of adjacent housing sections (5a, 5b, 5c), which end regions are joined together without overlapping. A sealing tape (31), disposed at the inside of the clamping U-bolt (17), seals the gap between mutually adjoining housing sections (5a, 5b 5c) when the clamping U-bolt (17) is tightened.

5 Claims, 3 Drawing Sheets

DEVICE AND METHOD FOR CONNECTING HOUSING SECTIONS OF SOOT PARTICLE FILTERS

BACKGROUND

The subject matter of the invention is a device and a method for connecting housing sections for soot particle filters, as well as a clamping U-bolt.

In the case of vehicles with combustion engines, filters and catalytic converters are being used to an increasing degree for treating exhaust gases. In this way, the environmental load due to pollutants such as soot particles, hydrocarbons, carbon monoxide, or nitrogen oxides can be greatly reduced. For treating diesel exhaust gases, catalytically active soot particle filters are also known in which soot particles are first held on the filter surface and then—when the temperature is sufficiently high—converted catalytically. As a rule, filters and catalytic converters comprise a ceramic carrier or monolith that is provided with a so-called wash coat making the surface larger. This monolith is held in a metallic housing or the so-called canning that is installed rigidly in the exhaust-gas line.

In the case of diesel particle filters, as a rule the combustion of the particles does not take place completely without residue. Over time, additives contained in motor oil and in diesel fuel can lead to ash deposits in the filter. Metal wear debris in the engine likewise leads to the formation of ash. This increases the exhaust gas back pressure of the filter and thus the fuel consumption. Soot particle filters therefore must be regularly serviced or cleaned, e.g., annually or after reaching a predetermined number of miles traveled. For this purpose, soot particle filters must be separated from the exhaust-gas line and can be reattached after cleaning.

From DE 20012812 U1, an exhaust-gas cleaning device is known with a housing constructed from several cylindrical modules in which a filter unit is installed in at least one of these modules. The individual modules can be placed one in the other or joined to each other by flange-like fastening elements. In the case of metallic housings, the modules are welded for mutual attachment. Because the housing modules are welded to each other, the filter unit can be removed only when the housing is separated. Even without welding, flanges that project outward on the housing take up a lot of space. In the case of housing modules pushed one inside the other, space and play for movements are likewise required in the direction of the housing axis, so that the individual modules can be separated from each other.

SUMMARY

The objective of the present invention is to create a device and a method for the production of a detachable connection for housing sections of soot particle filters. Another objective of the invention is for allowing a simple removal and re-insertion of a filter unit for an exhaust-gas line, even when the spatial relationships are dimensioned narrowly. Another objective of the invention is for forming the fastening device that is insensitive relative to vibrations and exhaust-gas back pressures.

These objectives are met by a device and a method for connecting housing sections in the case of soot particle filters as well as a clamping U-bolt according to the features of Claims 1, 6, and 7.

The device according to the invention comprises a multiple-part cylindrical housing, wherein the individual housing sections have peripheral beads or seams impressed from the inside on the lateral surface in the region of the end faces. Every two adjacent housing sections are held together by a yoke-like clamping U-bolt with a bracket-like shoulder along each of the two longitudinal sides. When the clamping U-bolt is tightened, its shoulders press elastically from the outside against the outward-projecting bead rings on the housing sections. The housing sections are therefore aligned coaxially and pressed against each other. One or both ends or end faces of the tube-like housing sections could have an inward-projecting step that increases the mutual contact surface area and improves the sealing properties of the connection. Alternatively, the housing sections could also be constructed without such collars reducing the inner diameter. Between the shoulders, a temperature-resistant sealing tape is formed on the inside of the clamping U-bolts made from sheet metal or stainless steel. In the assembled state, this sealing tape covers the gap between the joined-together housing sections and is pressed by the clamping force of the U-bolt from the outside tightly against the end regions of the housing sections.

In the case of a three-part housing, its middle part could be constructed for housing the soot particle filter. After detachment and shifting or removal of the two clamping U-bolts, this middle part can be pulled out without a problem laterally or in a plane vertical to the housing axis and thus separated from the two end parts of the housing connected to the feed or discharge lines. Here, movement of the middle housing section in the direction of the housing axis is not required. After cleaning or regeneration of the filter, it can be reinstalled in an analogous way. With the fastening device according to the invention, housings for soot particle filters could feature maintenance-friendly installation and construction even in the case of narrow spatial relationships.

BRIEF DESCRIPTION OF THE DRAWINGS

The invention will be described in greater detail below with reference to a few figures. Shown here are.

DETAILED DESCRIPTION OF THE PREFERRED EMBODIMENTS

Figure 1:
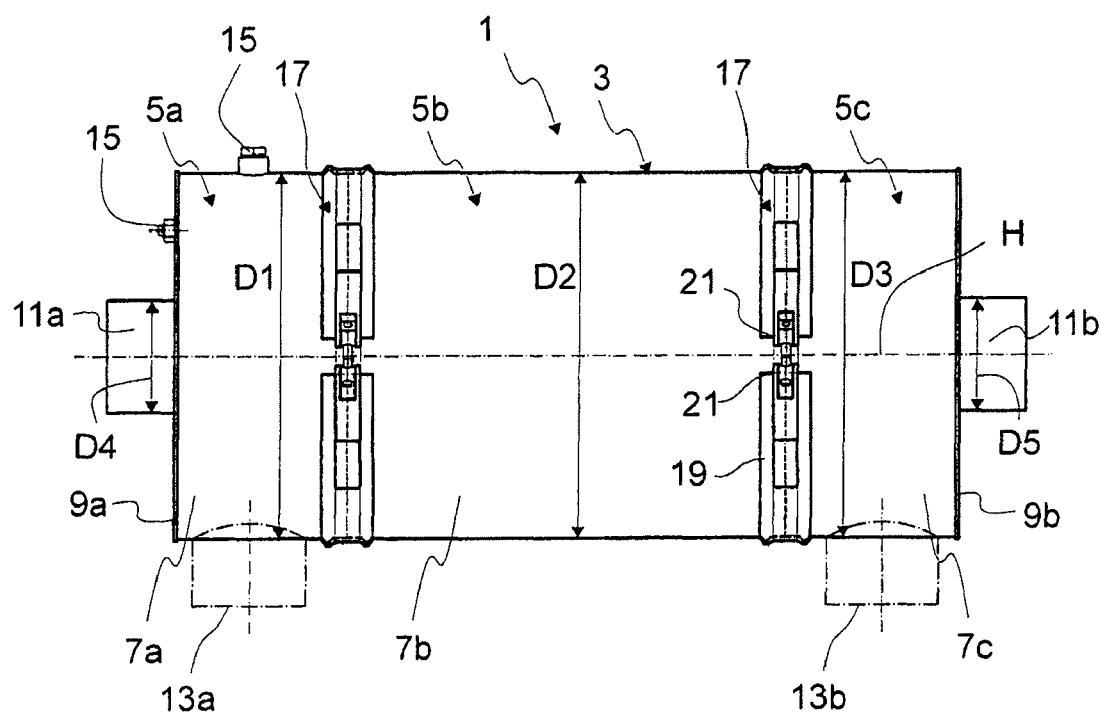
FIG. 1 a front view of a filter unit with a cylindrical housing comprising three housing sections, FIG. 2 a side view of the filter unit from FIG. 1, FIG. 3 a detail of the housing from FIG. 1 in the region of two adjacent housing sections without a clamping U-bolt, FIG. 4 a cross section of the housing from FIG. 1 in the region of the connecting point of two housing sections, FIG. 5 a side view of the clamping U-bolt in the region of a turnbuckle, FIG. 6 a top view of the clamping U-bolt in the region of the turnbuckle, and FIG. 7 a cross section of the clamping U-bolt along the line A-A in FIG. 5.

FIG. 1 shows a front view of a filter unit 1 with a housing 3 that comprises three housing sections 5a, 5b, 5c with essentially cylindrical lateral surfaces 7a, 7b, 7c with the outer diameters D1, D2, and D3.

Typically, the outer diameters D1, D2, D3 each lie, according to the application, on the order of magnitude of approximately 100 mm to approximately 400 mm. The end faces of the housing 5 or the inlet-side housing section 5a and the outlet-side housing section 5c are formed by annular plates 9a, 9b, each having a cylindrical connection port 11a, 11b with the diameters D4 and D5 arranged coaxial to the housing axis H. These diameters typically lie on the order of magnitude of approximately 40 mm to approximately 150 mm.

Figure 2:
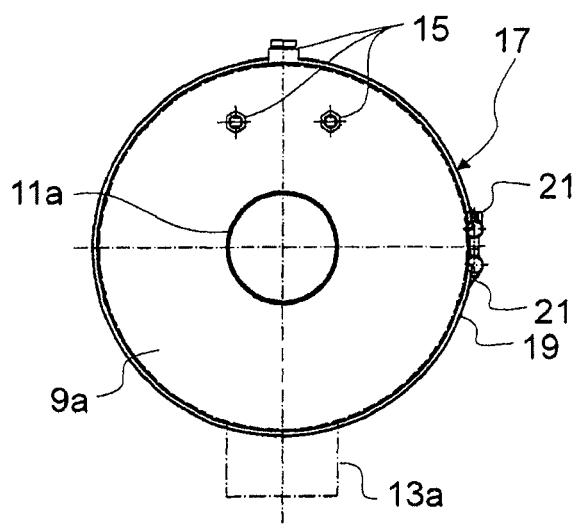

Alternatively, connection ports 13a, 13b projecting radially on the corresponding lateral surfaces 7a, 7c are also formed on the housing sections 5a and 5c, as is shown in FIGS. 1 and 2 by dashed lines. Obviously, in this variant, passage openings in the lateral surfaces 7a, 7c would be formed in the region of the connection ports 13a, 13b and the plates 9a, 9b closing the housing 5 laterally would be closed. The shape, arrangement, and size of the connection ports 11a, 11b are aligned according to the conditions of the corresponding exhaust-gas line in which the filter unit 1 is to be installed (as a rule by welding).

The invention comprises an arbitrary number of additional constructions of housings 5, wherein these comprise at least two adjacent housing sections 5a, 5b or 5b, 5c and in which these housing sections 5a, 5b, 5c have an essentially cylindrical shape at least in the adjacent regions. In the embodiment shown in FIGS. 1 to 4, all of the housing sections 5a, 5b, 5c comprise a cylindrical casing-like steel sheet with the thickness 1.25 mm. The wall thickness of the closing plates 9a, 9b equals 3 mm. Obviously, other wall thicknesses or wall thickness combinations are also possible. In particular, the wall thicknesses of the individual housing sections 5a, 5b, 5c could be equal or different. The outer diameters D1, D2, D3 of the three cylindrical housing sections 5a, 5b, 5c are all of equal size in the shown example. Passage openings 15 that can be closed and that are provided, e.g., with threading on the lateral surface 7a and on the closing plate 9a are formed on the first housing section 5a. There, e.g., connection cables for sensors can be guided into the interior of the housing 3.

Figure 5:
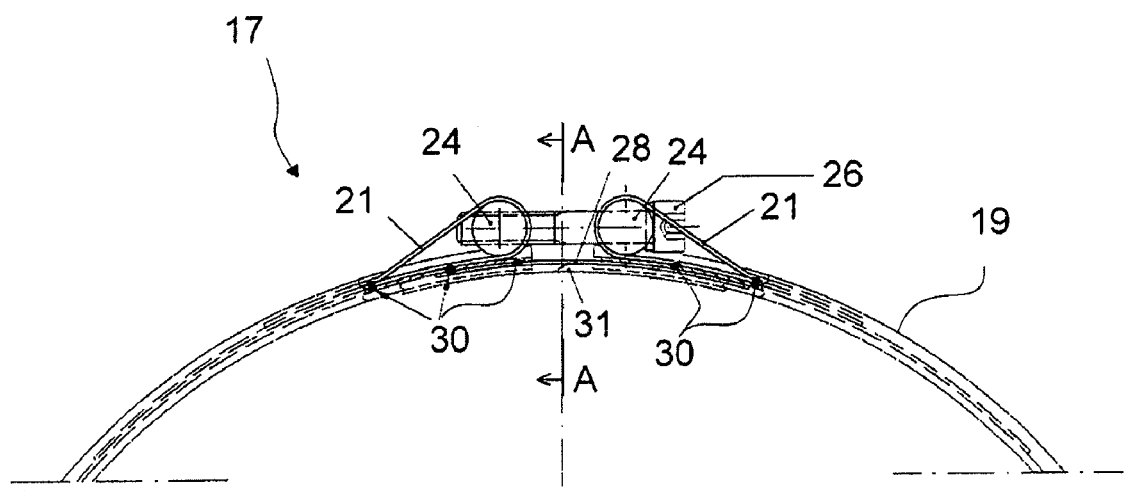
Figure 6:
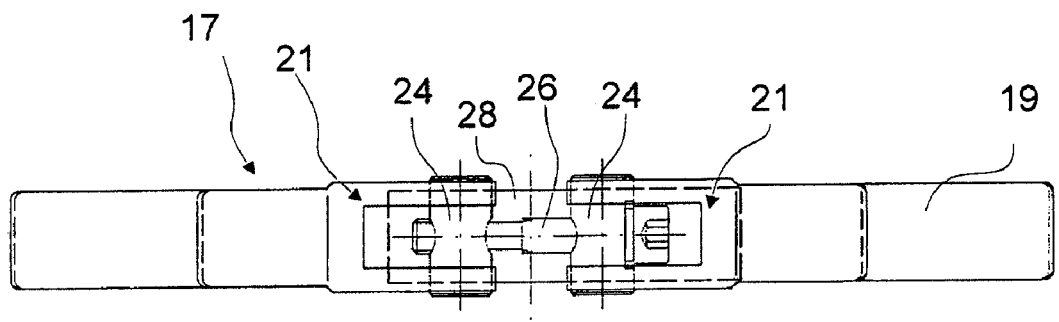
Figure 7:
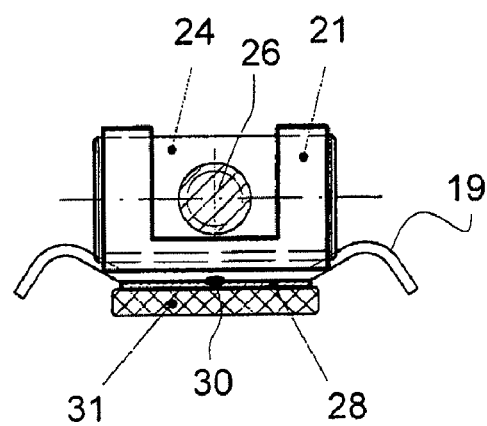

Every two adjacent housing sections 5a, 5b or 5b, 5c are connected detachably to each other by a clamping U-bolt 17. The clamping U-bolt 17 comprises a band 19 with a yoke-like cross section with metallic band loops 21 welded on both ends each for holding a cylindrical insert 24. These inserts 24 belong to the turnbuckle 22 (FIGS. 5, 6, and 7).

Figure 3:
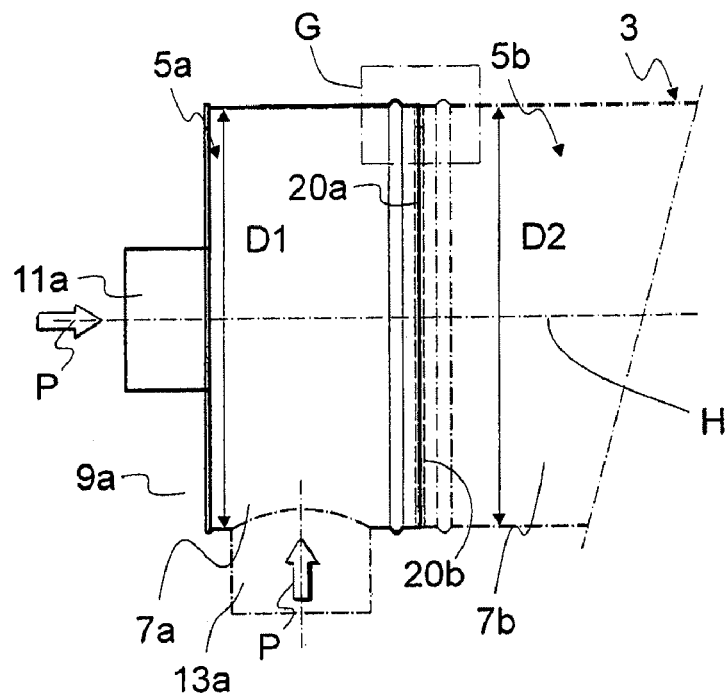
Figure 4:
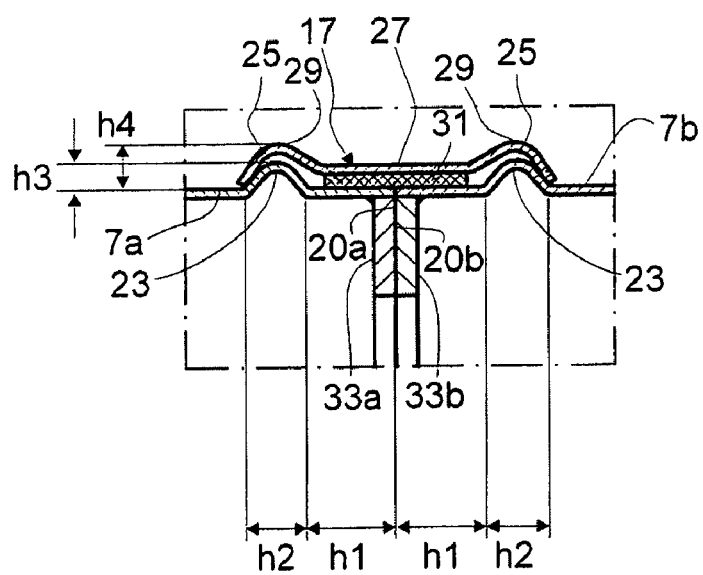

FIG. 3 shows a partial diagram of the housing 3 with two adjacent housing sections 5a and 5b without the clamping U-bolt 17. The arrows marked with "P" in the connection ports 11a, 13a indicate the direction of flow of the exhaust gases. FIG. 4 shows a region of the housing 3 marked in FIG. 3 by the dash-dot line G as a section diagram, but this time including the clamping U-bolt 17.

Alternatively, the outer diameters D1, D2, D3 of the housing sections 5a, 5b, 5c or the adjacent regions of the housing sections 5a, 5b, 5c could also be different. At axial distances S1 and S2 from adjacent end faces 20a, 20b of two housing sections 5a, 5b, respectively, peripheral seams 23 could be formed on the insides or peripheral beads 25 could be formed on the outsides of the lateral surfaces 7a, 7b. Adjacent to a middle region 27 of the clamping U-bolt 17, wherein this middle region has an approximately straight-line cross section, there are bracket-like or gripper-like bulges 29 or shoulders that contact the outsides of the bead 25 elastically when the clamping U-bolt 17 is tightened and thus press together the two housing sections 5a, 5b in the direction of the housing axis H and simultaneously also align these sections relative to each other. In an analogous way, other deformations arranged at a distance to the housing section ends 20a, 20b or joints and projecting to the lateral surfaces 7a, 7b and/or set in these surfaces could be used as stops for corresponding structures or deformations on the clamping U-bolt 17 for the overlap-free connection of the housing sections 5a, 5b. Instead of deformations of the lateral surfaces 7a, 7b, e.g., rings or other structures could also be fused with the lateral surfaces 7a, 7b and used as stop elements for the bracket-like edges of the clamping U-bolt 17.

The abutting ends 20a, 20b of the housing sections 5a, 5b are provided in the example of FIG. 4 with inward projecting steps 33a, 33b, wherein a larger contact surface is produced for the two housing sections 5a, 5b. The joint or the gap 35 between the two housing parts 5a, 5b can also be sealed by a sealing tape 31 made from ceramic, glass fibers, or a different, thermally resistant material. As shown in FIG. 4, this sealing tape 31 is clamped tight between the clamping U-bolt 17 and the hoop-shaped end regions of the housing sections 5a, 5b when the clamping U-bolt 17 is tightened. The sealing tape 31 can be fixed, e.g., on the inside of the band 19 by a temperature-resistant adhesive. The attachment points for the seams 23 or beads 25 are arranged at an axial distance h1 (advantageously 1 mm<h1<50 mm, e.g., h1=12 mm) from the corresponding ends 20a, 20b of the housing sections 5a, 5b. The seams 23 or beads 25 have a width h2, wherein the position with the maximum height h3 of the bead 25 or the maximum depth h3 of the depression of the seams 23 is arranged, as a rule, approximately in the middle. As a rule, a height h3 on the order of magnitude of a few millimeters, for example, 3 mm, is sufficient. The geometry of the clamping U-bolt 17 is aligned to the mass and shape of the adjacent housing sections 5a, 5b, so that—in the case of beads 25 projecting outward on the lateral surfaces 7a, 7b—the bulges 29 surround the beads 25 and the housing section ends 20a, 20b and optionally the steps 33a, 33b are aligned relative to each other or coaxially and are pressed against each other. Outside of the tightening device of the clamping U-bolt 17, the connection device thus has a very small projection h4 of, e.g., 5 mm to 10 mm, advantageously less than 7.5 mm, past the outer diameter D1, D2, D3 of the housing sections 5a, 5b, 5c. Therefore, assembly and disassembly are possible even under narrow spatial relationships. This applies analogously also in the case of holding structures in the shape of seams 23 that are set from the outside into the lateral surfaces 7a, 7b, 7c of the housing sections 5a, 5b, 5c. In this case, the bulges 29 are adapted along the longitudinal sides of the band 19 to the shape of the lateral surfaces 7a, 7b, so that they engage in the seams 23 of adjacent housing sections 5a, 5b when the clamping U-bolt 17 is tightened. Therefore, the housing sections 5a, 5b are aligned coaxially and pressed against each other (not shown). The clamping U-bolt 17 thus must have regions engaging only in the seams 23. An overlap or surrounding of the seams 23 in the axial direction is not absolutely necessary.

The band length of the clamping U-bolt 17 is directed according to the outer diameter D1, D2, D3 of the housing sections 5a, 5b, 5c to be connected. It is advantageously dimensioned so that, for a tightened clamping U-bolt 17, a distance of a few millimeters up to a few centimeters—according to the extent of the lateral surfaces (7a, 7b) to be enclosed—remains between the two end faces of the band 19. FIG. 5 shows a side view of the clamping U-bolt 17 in the region of the turnbuckle 22, FIG. 6 shows a top view of this clamping U-bolt 17, and FIG. 7 shows a cross section of the clamping U-bolt 17 along the line A-A in FIG. 5.

The first insert 24 comprises a radial through hole for guiding a screw 26. The second insert 24 is formed as a nut with an inner thread for the screw 26. When the screw 26 is tightened, the diameter of the band 19 bent into a ring shape is reduced. In the region of one band end, a tab 28 overlapping this band end is connected to the band 19 by weld points 30 on the bottom side of the band 19 (the weld points 30 between the band 19 and the band loops 21 on the top side of the band 19 are also visible). The tab 28 overlaps the band end and grips under the opposing other band end, without, however, being connected rigidly to this end. The tab 28 is used as a stop for the sealing tape 31.

In the case of alternative constructions, the length of the band 19 could be dimensioned so that its two end faces just touch for a correctly tightened clamping U-bolt 17 or leave only a small intermediate space in the range of millimeters. In the case of another alternative construction, the two ends of the band 19 could also overlap.

Soot particle filters that are installed in a housing 3 with several housing sections 5a, 5b, 5c that can be connected according to the invention and can be disassembled, cleaned, and then reassembled in a simple way. After the clamping U-bolts 17 are loosened, these can be shifted axially, so that they no longer overlap the connection points. Alternatively, the clamping U-bolts 17 could also be opened completely and then removed. Because adjacent housing sections 5a, 5b, 5c do not overlap, the middle housing section 5b that is not connected rigidly to the exhaust-gas line could be pushed forward laterally or radially without axial displacement and then separated from the rest of the housing 3. After the cleaning or maintenance of the filter element that is arranged in the middle housing section 5b, this housing section 5b could be integrated back into the housing 3 in the reverse sequence.

The invention claimed is:

1. A soot particle filter housing, comprising housing sections (5a, 5b, 5c) that include end regions that can be connected to each other, the housing sections include cylindrical lateral surfaces (7a, 7b, 7c), and holding structures project radially from or are recessed in the lateral surfaces (7a, 7b, 7c) and are constructed axially spaced apart from corresponding housing section ends (20a, 20b) that are connectable together, a clamping fixture connects adjacent ones of the housing section ends together, the end regions between the holding structures and the housing section ends have a cylindrical outer surface, and the end regions are connected to one another so that they are axially adjacent without overlapping.

2. Device according to claim 1, wherein the holding structures comprise at least one of beads (25) projecting on the lateral surfaces (7a, 7b, 7c) or seams (23) set into the lateral surfaces (7a, 7b, 7c) from inside or outside.

3. Device according to claim 1, wherein the clamping fixture comprises a yoke-like clamping U-bolt (17) including a band (19) bent into the shape of a hoop with gripper-like bulges (29) along each of two longitudinal sides of the band (19) that engage the at least one of the beads or seams.

4. Device according to claim 3, wherein between the bulges (29) there is a region (27) with a straight-line cross section and between the bulges (29) there is a sealing tape (31) on an inside of the band (19) or fixed on the band (19) that contacts the cylindrical outer surface of the housing end sections.

5. Device according to claim 3, wherein a projection height h4 of the clamping U-bolt (17) past the lateral surfaces (7a, 7b, 7c) equals less than 10 mm in a tightened state of the clamping U-bolt (17).

* * * * *